United States Patent [19]

Claps et al.

[11] Patent Number: 5,489,171
[45] Date of Patent: Feb. 6, 1996

[54] VEHICLE TRANSPORTER

[75] Inventors: William R. Claps, New York, N.Y.; Sergio Ghidini, Villavara di Bomporto, Italy

[73] Assignee: Global Transport Systems, Inc., Glen Ridge, N.J.

[21] Appl. No.: 228,091

[22] Filed: Apr. 15, 1994

[51] Int. Cl.$^6$ ........................................................ B60P 3/08
[52] U.S. Cl. .................... 410/26; 410/4; 410/13
[58] Field of Search ...................... 410/4, 13, 26, 410/28, 29.1, 11, 16, 17; 414/498; 187/216

[56] References Cited

U.S. PATENT DOCUMENTS

| | | |
|---|---|---|
| 3,675,795 | 7/1972 | Dluhy . |
| 4,124,119 | 11/1978 | Nordstrom . |
| 4,668,141 | 5/1987 | Petersen ........................ 410/24 |
| 4,668,142 | 5/1987 | Fity et al. . |
| 4,768,916 | 9/1988 | Gearin et al. . |
| 4,963,067 | 10/1990 | Gearin et al. . |
| 5,040,935 | 8/1991 | Gearin et al. . |
| 5,051,046 | 9/1991 | Oren ............................ 410/26 |
| 5,067,862 | 11/1991 | Andre ........................... 410/24 |
| 5,253,975 | 10/1993 | Takaguchi ..................... 414/498 |
| 5,297,908 | 3/1994 | Knott ........................... 410/26 |
| 5,332,345 | 7/1994 | Lillard ........................ 410/29.1 |
| 5,344,266 | 9/1994 | Kolb ............................ 410/26 |

FOREIGN PATENT DOCUMENTS

| | | |
|---|---|---|
| 1220973 | 1/1960 | France ........................ 410/26 |
| 898554 | 11/1953 | Germany ..................... 410/26 |
| WO8101997 | 7/1981 | WIPO . |

OTHER PUBLICATIONS

"Formula One Shipping Method", 5 pages, Mar. 1993.

*Primary Examiner*—Michael S. Huppert
*Assistant Examiner*—Gregory A. Morse
*Attorney, Agent, or Firm*—Brumbaugh, Graves, Donohue & Raymond

[57] ABSTRACT

A vehicle transporter for supporting cars for shipment in a shipping container includes a lower pallet and an upper pallet, each of which is adapted to receive a car with its wheels supported thereon. A pair of columns is pivotally affixed to each side of the lower pallet. The upper pallet is affixed to the columns at a selected adjustable height above the lower pallet and substantially parallel to the lower pallet. A length-adjustable brace is connected diagonally between the upper and lower pallets to impart stiffness to the transporter. Each pallet has a tie down at each end so that the car body can be lowered on its suspension, thereby allowing cars with higher silhouettes loaded on the transporter to be received within the container. The upper pallets have openings, which permit an upper portion of a car to protrude through the opening to a height above the level of the upper pallet.

23 Claims, 9 Drawing Sheets

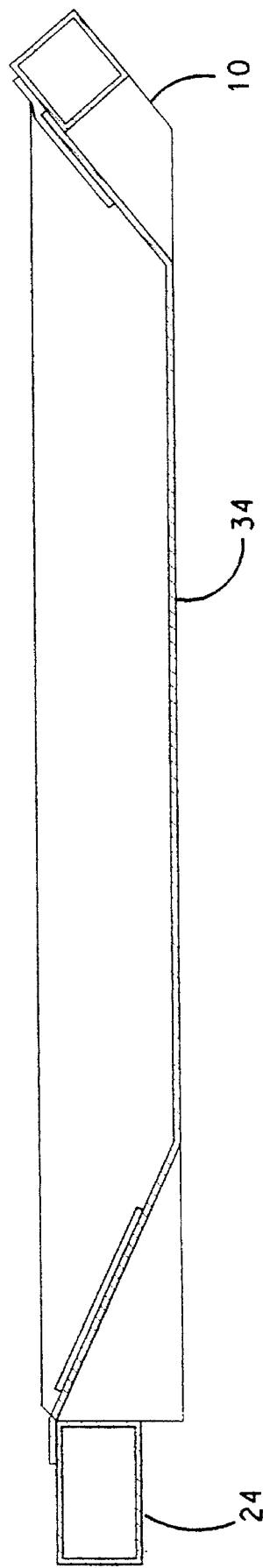
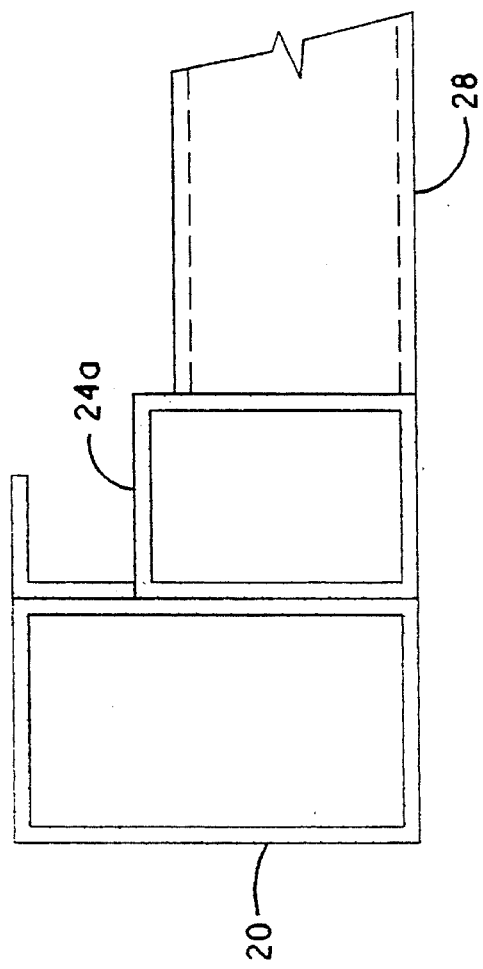
FIG. 5
FIG. 6

VEHICLE TRANSPORTER

BACKGROUND OF THE INVENTION

The present invention relates to a vehicle transporter for transporting motor vehicles, such as automobiles, inside a shipping container by such means as railcar, truck, ship, or barge.

In 1992, over seven million cars were produced by U.S. and foreign car manufacturers in North America. Automobile factories are generally located long distances from the market where the cars will be sold, and therefore the cars must be transported to their final destination. The majority of cars manufactured in the U.S., Mexico, and Canada are moved by railroad from the factory to a central distribution point, where they are then transported to dealers on over-the-road car carriers, or exported by ship.

At present most vehicles are transported from the factories in bilevel and trilevel autorack railcars, and open highway trailers such as those shown in Baker U.S. Pat. No. 2,492,829 or Fity et al. U.S. Pat. No. 4,668,142. These railcars and trailers are the traditional mode of transport for the car industry, but this transport mode has a number of flaws. Damage due to human contact is a major problem, because the cars have to be driven onto and off of the railcars. Damage caused by acid rain and foreign objects is another reason that transport by rail cars is becoming less attractive to car manufacturers. There is a need for a faster, safer and more economical means of transporting cars from the point of manufacture to the point of sale. There is also a need for effectively utilizing the cargo space which may be available as the railcars and trailers are returned to their point of origin.

A number of attempts have been made to solve the problems discussed above. For example, Gearin et al. U.S. Pat. No. 5,040,935 describes and shows a system for loading and transporting wheeled vehicles inside a shipping container. The system allows the cars to be loaded onto carrier racks outside the shipping container and then placed into the container where they are protected from external hazards. While the transporter disclosed in the Gearin patent has attained some limited commercial success, the system described also has a number of problems.

First, Gearin discloses a highly complex, costly frame structure which requires the use of an external hoist to load and unload cars. The complexity of the system therefore requires up to three people to assist during loading operations.

Second, due to the complex nature of the loading procedure, it takes a significant amount of time to load each shipping container.

Third, the system utilizes a large and bulky loading frame which makes it difficult to work with.

Fourth, the large size of the Gearin loading frame does not lend itself to mass production technology.

Another Gearin patent, U.S. Pat. No. 4,768,916, discloses a collapsible frame system for loading cars into a shipping container. The Gearin frames are designed to collapse so that a number of the frames can be stored in the same shipping container on a return trip to the point of origin. A problem with this design, however, is that collapsing the frame involves a complex, multi-step procedure. Additionally, numerous components must be removed from the frame before it can be collapsed, and these components may be damaged or lost during a return trip to the point of origin.

Another attempt to ship vehicles inside shipping containers has been developed by J. B. Hunt. In the Hunt system, the frame which holds the cars is assembled inside the container, and the cars are then driven into the container and secured onto the frame. The major disadvantage of this system is that after the cars are driven into the container it is difficult for the drivers to exit the car, and there is a danger that the car doors will be damaged when they bang into the container walls.

SUMMARY OF THE INVENTION

One object of the present invention is to provide a vehicle transporter which has a simpler design than those proposed by Gearin in U.S. Pat. Nos. 5,040,935 and 4,768,916, thereby making it more cost-efficient to manufacture. Another object is to provide a transporter which can be easily assembled by a limited number of operators, without the need for specialized assembly tools. It is also desired that a car transporter be capable of being more easily collapsed for dense packing inside a shipping container, thereby enabling a greater number of transporters to be efficiently placed in the same container on a return trip to the point of origin.

To fulfill the foregoing objects, there is provided, according to the present invention a vehicle transporter for supporting cars for shipment in a shipping container that includes a mass-produced pallet which, through the addition of specific components to it, can be configured as either a lower pallet or an upper pallet. The pallet is specifically adapted to support a car by its wheels. Each pallet includes an opening, the importance of which becomes evident when the a pallet is used as an upper pallet, into which an upper portion of a first vehicle is adapted to protrude. Each pallet also includes a tie-down means which is located adjacent to its end for lowering the suspension of the vehicle loaded on the pallet. By lowering the suspension of each vehicle, cars with higher silhouettes may be successfully loaded into shipping containers using the inventive transporter, thereby maximizing the possible applications.

The transporter has a pair of vertical columns which are affixed to each side of the lower pallet. Each column is attached at its lower end to a lower bracket that is affixed to the lower pallet. Each lower bracket, which has a socket for receiving the column within it, is attached to the lower pallet at a selected adjustable position along the side of the lower pallet. The socket of each lower bracket has an opening so that each column, which is pivotally attached to a respective lower bracket, can be folded down through the socket opening for shipping the transporter in the shipping container without cars. Due to the collapsible nature of the transporter columns, a large number of disassembled transporters can be stacked in one shipping container, thereby leaving a large number of shipping containers that traveled to a destination filled with cars completely available for shipping goods on the return trip to the point of origin.

Each column is attached in the proximity of its upper end to an upper bracket that is affixed to the upper pallet. Each upper bracket is attached to the upper pallet at a selected adjustable position along the side of the upper pallet. Each upper bracket has a socket which telescopically receives its corresponding column. The upper end of each column is tapered so that its upper extremity is substantially smaller than the socket of the upper bracket, thereby facilitating alignment and placement of the upper pallet above the lower pallet.

The column has a plurality of holes which enable a user to select the height at which the upper pallet will lie above the lower pallet. The upper bracket is affixed at the selected height on a respective column by using a removable pin which is received through holes in the bracket and through one of the selected holes in the column. After the upper pallet has been affixed to the columns, it is substantially parallel to the lower pallet.

A length-adjustable brace is connected diagonally between a side of the lower pallet between the columns and one of the columns proximate to the upper pallet or to the upper pallet near one of the columns. The brace operates to prestress the columns and pallets and impart stiffness to the transporter.

The vehicle transporter has a pair of side bumpers attached to each side of both the lower pallet and the upper pallet for guiding the transporter into the shipping container and to ensure a snug fit between the transporter and the inner wall of the shipping container to prevent unwanted movement of the transporter within the container.

The transporter also has a pair of laterally spaced apart end bumpers on at least one end of the lower pallet to space it a predetermined distance from a longitudinally adjacent transporter in the container. This prevents cars located on adjacent transporters from coming in contact with one another and prevents lengthwise movements of the transporters within the shipping container during shipment of the vehicles.

The vehicle transporter can be quickly and easily loaded with vehicles while it is outside of the shipping container. A standard shipping container can be loaded with 3 vehicle transporters, or 6 cars, by a crew of two men in approximately 20 minutes. The ease of loading is enhanced by the fact that assembly can take place without the use of hand tools. The only machinery needed is a crane, a fork-lift, or similar lifting device which will lift the upper pallet with the car loaded onto it and place it on the columns. The loaded transporter is then pushed into the shipping container.

The complete collapsibility of the columns enables numerous transporters to be efficiently stacked in an empty shipping container on the return trip to the point of origin, thus maximizing available cargo space in other containers.

The ability to mass produce a base pallet which can be easily configured to serve as an upper or lower pallet through the addition of components makes the transporter much more economical than transporters such as those of the Gearin et al. U.S. Pat. No. 5,040,935. The efficient collapsibility of the transporter, as compared to other complex procedures utilized (e.g. Gearin et al. U.S. Pat. No. 4,768, 916), maximizes the use of personnel resources.

BRIEF DESCRIPTION OF THE DRAWING

Further objects and advantages of the invention will be apparent from the following description of an exemplary embodiment thereof, taken in conjunction with the accompanying drawings, in which:

FIG. 5 is partial side cross-sectional view of the pallet, taken along the lines 5—5 of FIG. 4;

FIG. 6 is a partial end cross-sectional view of the pallet, taken along the lines 6—6 of FIG. 4;

DETAILED DESCRIPTION OF THE INVENTION

Figure 1:
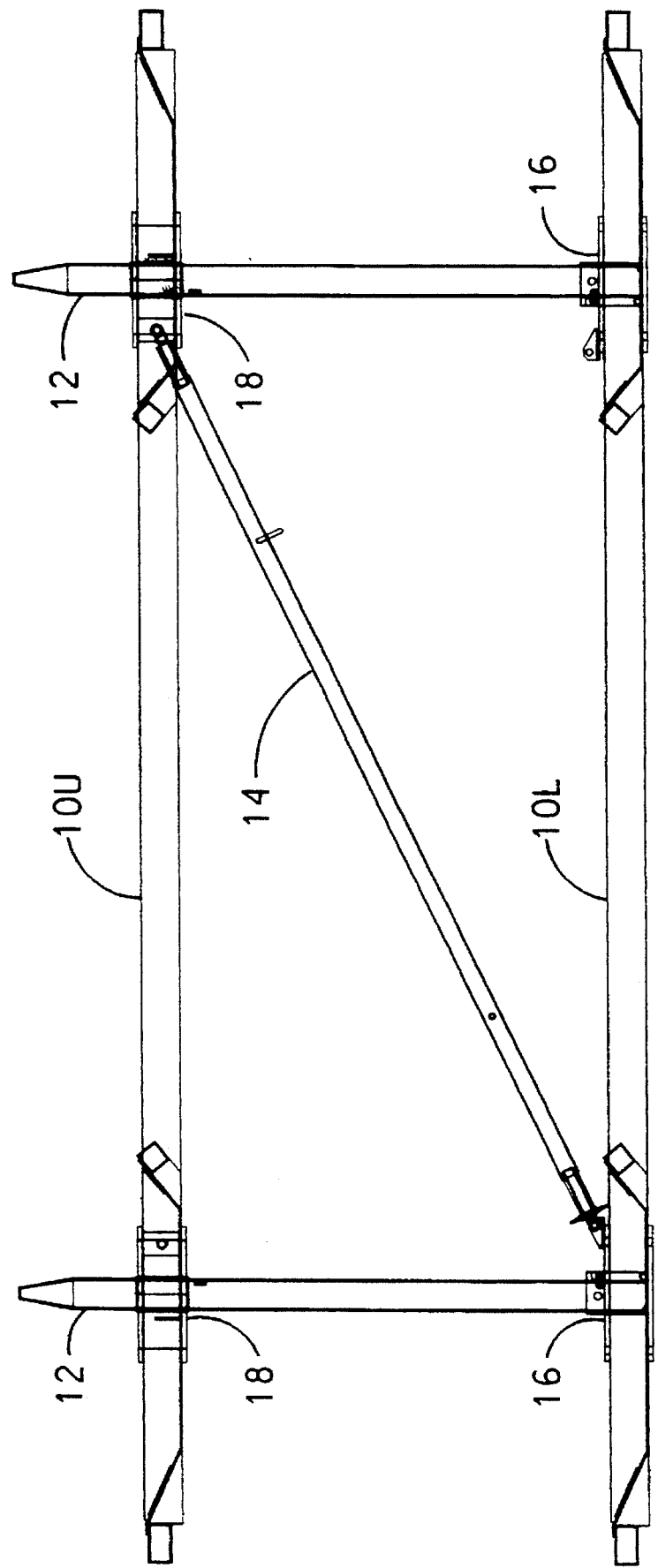
FIG. 1 is a side elevational view of the embodiment.
Figure 2:
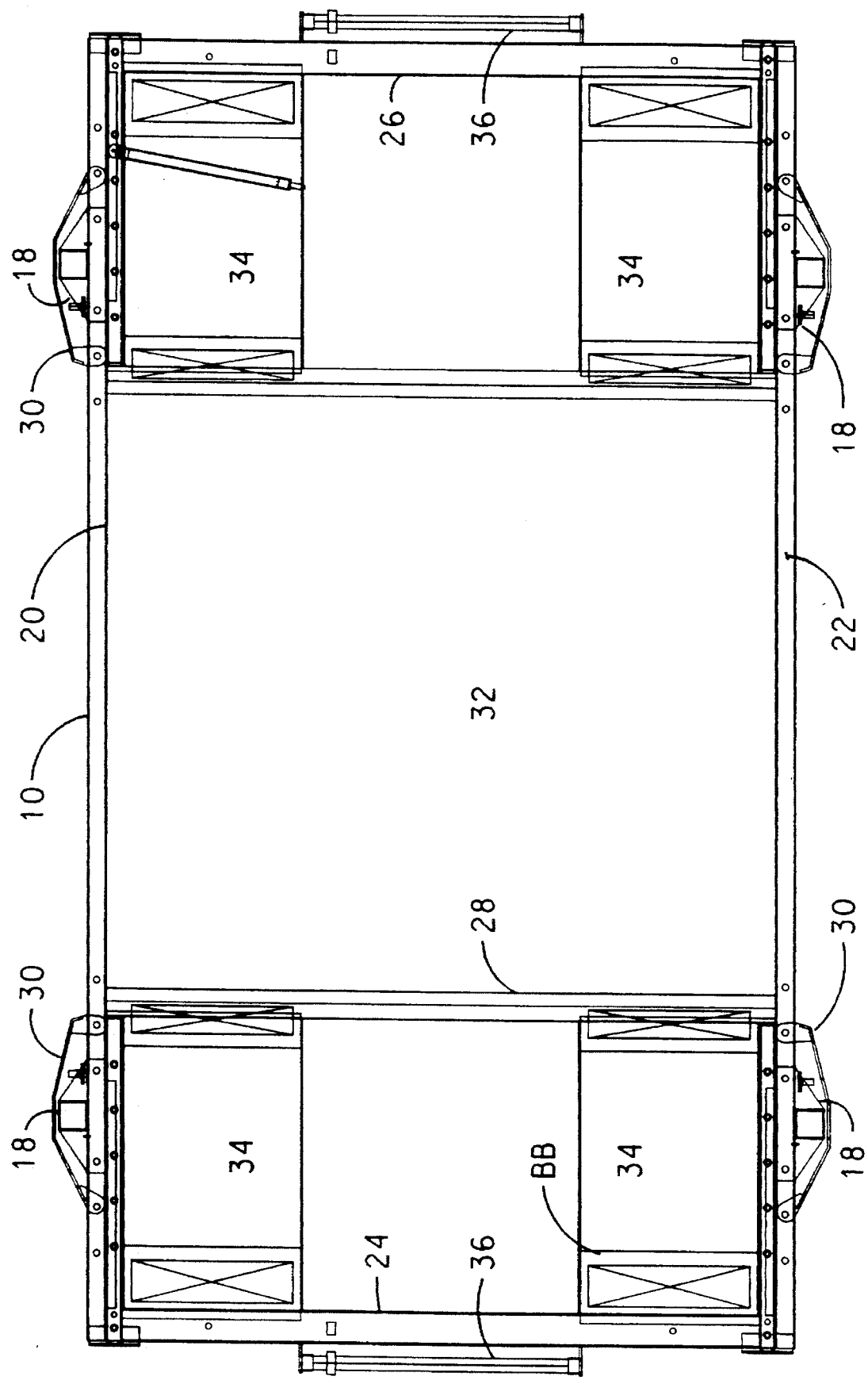
FIG. 2 is a top plan view of the embodiment.
Figure 3:
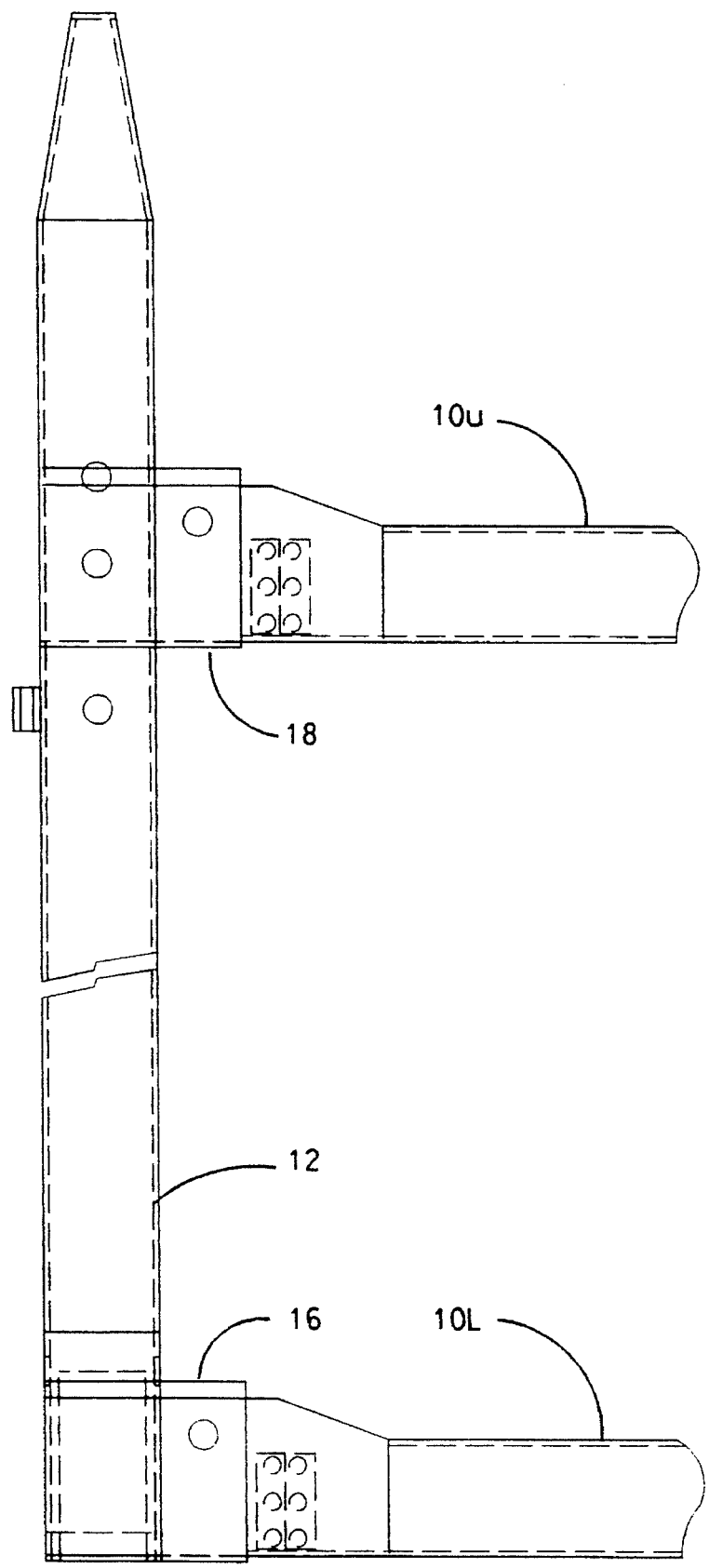
FIG. 3 is a partial end elevational view of the embodiment.

Referring first to FIGS. 1 to 3, the embodiment of a vehicle transporter, in accordance with the present invention, comprises a lower pallet 10L and an upper pallet 10U, each of which is adapted to receive a car with its wheels supported thereon, Four columns, one near each corner of the transporter, are attached to side members of the lower pallet. The upper pallet 10U is affixed to the columns 12 at a selected adjustable height above the lower pallet 10L in a position substantially parallel to the lower pallet. A length-adjustable brace 14 is connected diagonally between a side of the lower pallet between the columns and a side of the upper pallet between the columns. (In FIG. 2, a phantom line X in the lower right indicates that the upper pallet has been broken away to reveal the lower pallet).

Figure 4:
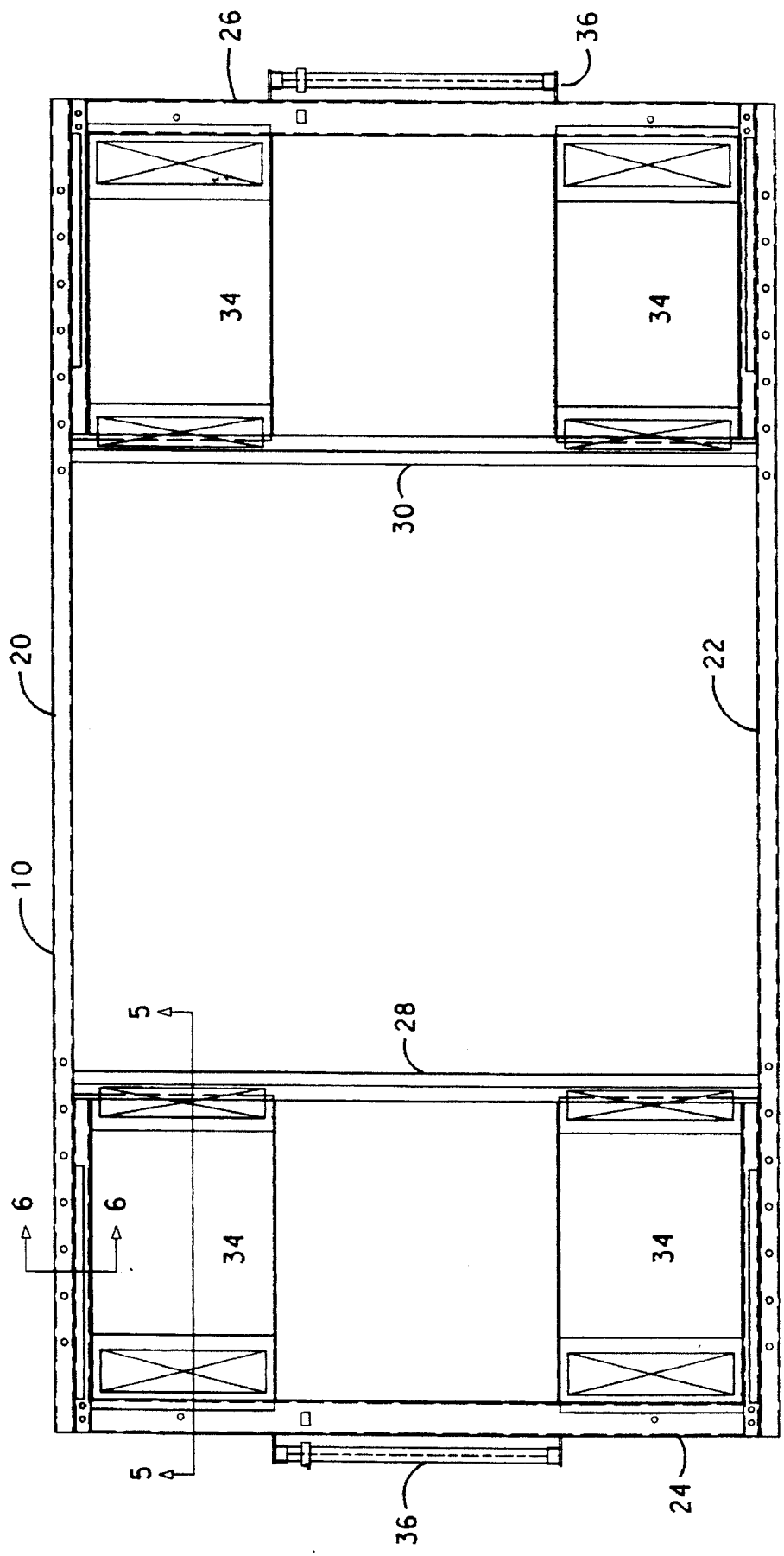
FIG. 4 is a top plan view of a pallet subassembly.

The lower and upper pallets 10L and 10U are identical and are fitted with lower brackets 16 and upper brackets 18, respectively, for joining the pallets 10 to the columns 12. The pallets 10 (FIGS. 4 to 6) have a peripheral frame constructed from tubular side members 20, 22 and end members 24, 26 and a pair of cross-members 28, 30. The space 32 within the frame and between the cross members is open. Pan-like wheel-support plates 34 are secured to the frame members at each corner. A tie-down bar 36 is fastened to each end frame member 24, 26.

Figure 7:
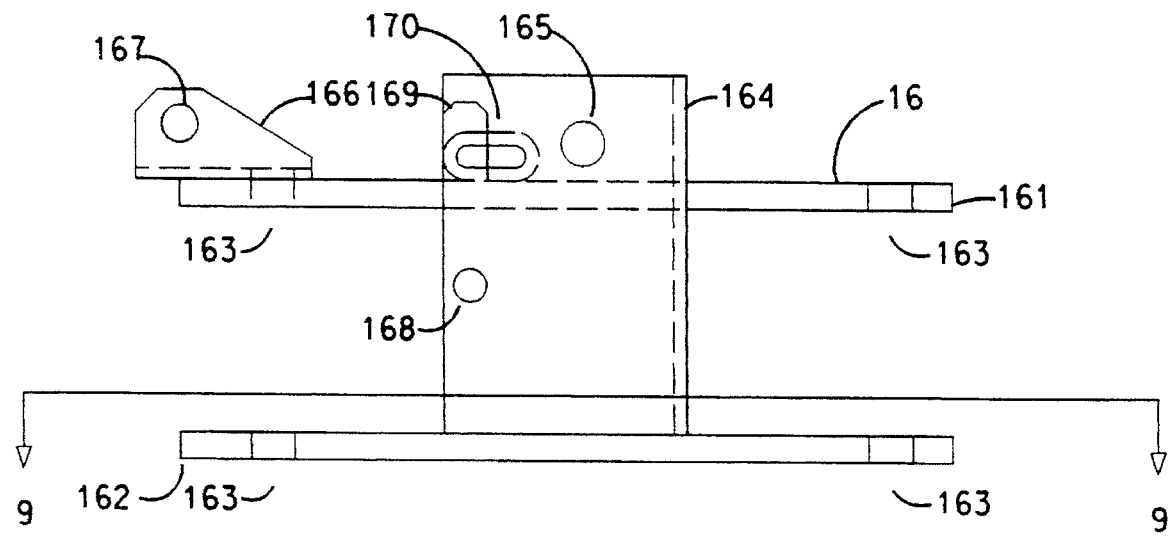
FIG. 7 is a side view of a lower bracket.
Figure 8:
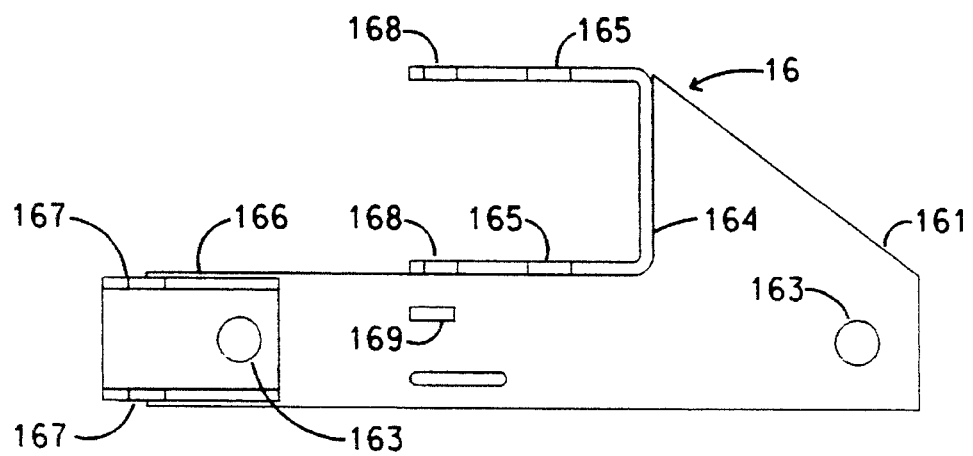
FIG. 8 is a top view of the lower bracket.
Figure 9:
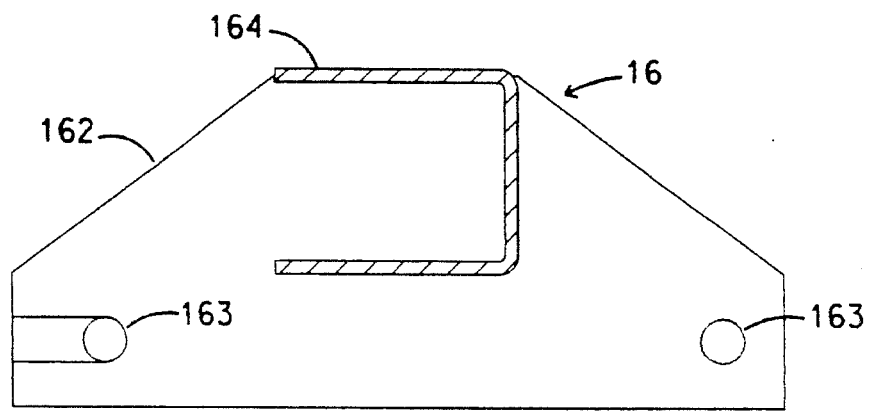
FIG. 9 is a top cross-sectional view of the lower bracket, taken along the lines 9—9 of FIG. 7.

Each lower bracket 16, as shown in FIGS. 7 to 9, comprises upper and lower plates 161, 162, each having two bolt holes 163, and a U-shaped socket piece 164, which has aligned holes 165 extending transversely. The plates straddle the side members of the frame, and bolts attach the brackets to the pallet. A channel-shaped lug 166 is affixed to the upper plate 161 and has transversely aligned holes 167. Transversely aligned holes 168 in the socket piece 164 receive a stop bolt for the column, as described below. A pin keeper plate 169 and a lifting ring 170 extend up from the upper plate laterally of the holes 165.

Figure 10:
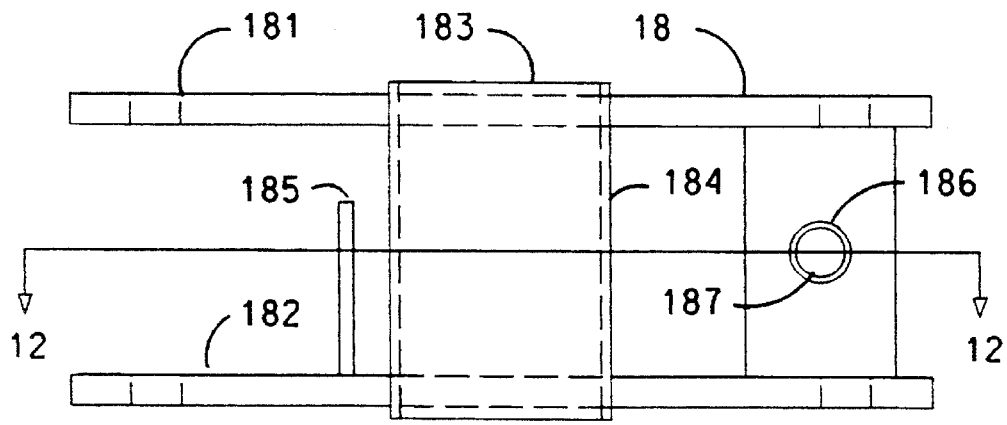
FIG. 10 is a side view of an upper bracket.
Figure 11:
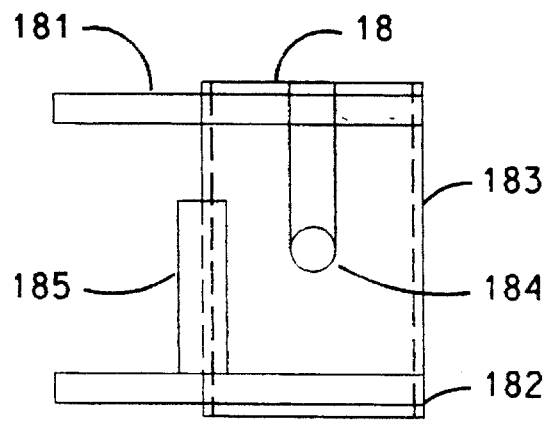
FIG. 11 is an end view, looking at the left side of FIG. 10 of the upper bracket.
Figure 12:
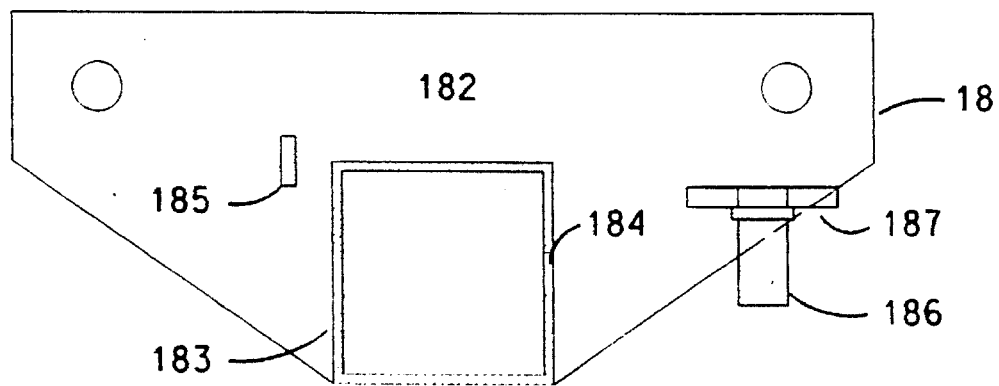
FIG. 12 is a top cross-sectional view of the upper bracket, taken along the lines 12—12 of FIG. 10.

The upper bracket 18, which is shown in FIGS. 10 to 12, has upper and lower plates 181 and 182, each having hole pairs for bolting the bracket to a pallet 10, and a closed tubular socket piece 183 affixed to the plates. Aligned holes 184 extend in the lengthwise direction, relative to the pallet, through the socket piece and receive a coupling pin by which the bracket 18 is affixed to a column, as described below. A keeper plate 185 extends up from the lower plate to capture an arm on the pin. A capture pin 186 (hidden and not shown in FIG. 11) for the diagonal brace 14 projects from a plate 187 fastened between the upper and lower plates 181 and 182.

As indicated above, the upper and lower brackets are attached to the pallets by bolts. As may be seen in FIG. 2, the side members of the pallet frames have several bolt holes for each bracket, which permits the brackets to be fastened to the pallets in different lengthwise positions. The ability to adjust the positions of the brackets on the pallets allows the transporter to be configured differently for different vehicles.

Figure 15:
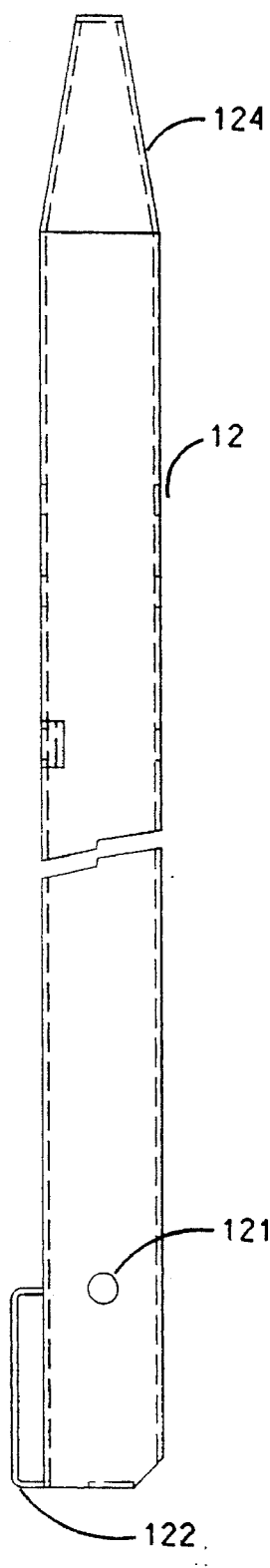
FIGS. 15 and 16 are side and end views of a column.
Figure 16:
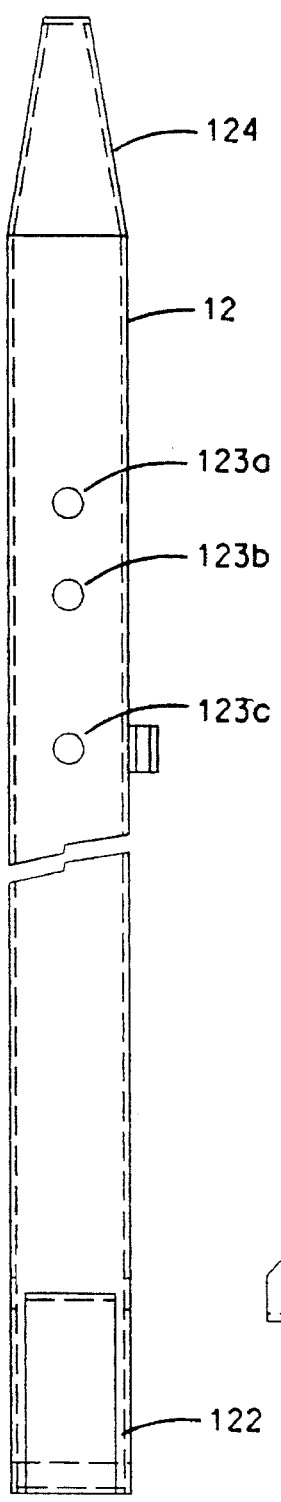
Figure 17:
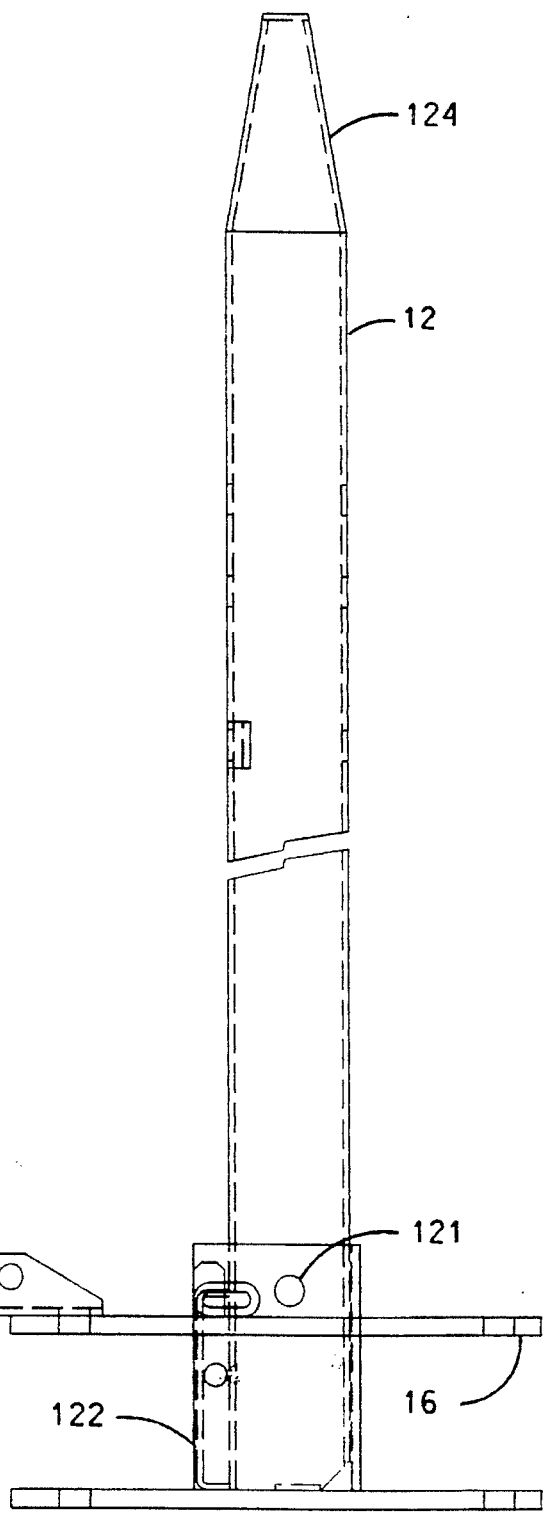
FIG. 17 is a side view of a column assembled to a lower bracket.

Referring to FIGS. 15 to 17, the columns 12 are tubular and of square cross-section. The external dimensions are such that the lower end of the column is received with a close sliding fit in the socket piece 164 of the lower bracket 16 and the upper part receives with a close sliding fit the socket piece 183 of the upper bracket. A hole 121 near to lower end of the column receives a pin, which also passes through the holes 165 in the socket piece 164 of the lower bracket. The pin pivotally attaches the column to the socket piece such the column can be collapsed by folding it down through the open side of the socket piece. A channel-shaped plate 122 receives a bolt or pin through the holes 168 in the lower bracket, which supports the column in the erected, vertical position.

Near the upper end of the column are three pairs of aligned holes 123a, 123b and 123c. Each hole pair provides for attaching the upper pallet 10U to the columns by pins that pass through the holes 184 in the socket pieces 183 of the upper brackets 18 at a different height above the lower pallet 10L. The selected height depends on the height of the vehicles being transported. It will be noticed that the upper end portions 124 of the column is tapered, which facilitates lowering an upper pallet onto the columns when the transporter is loaded for a shipment.

Figure 13:
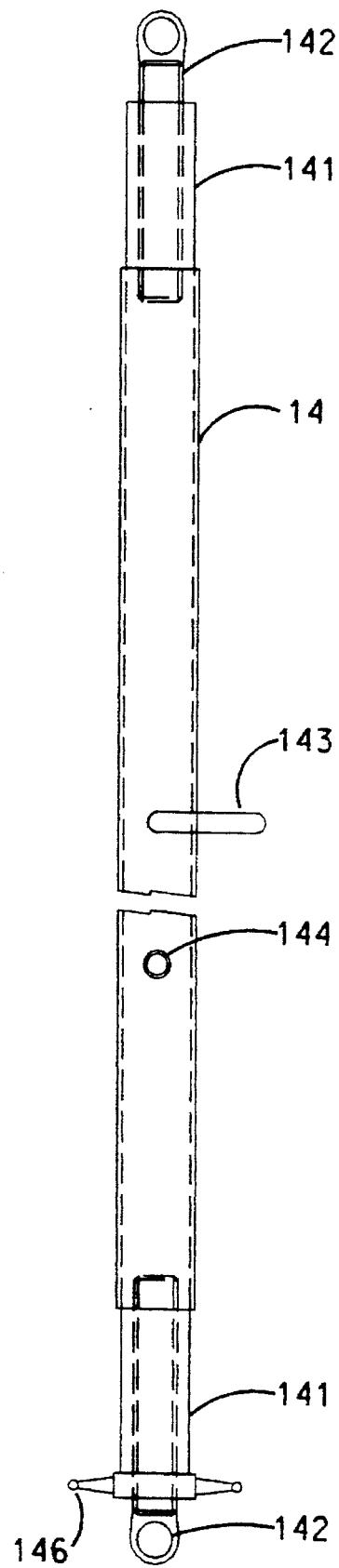
FIGS. 13 and 14 are side and top views of a diagonal brace.
Figure 14:
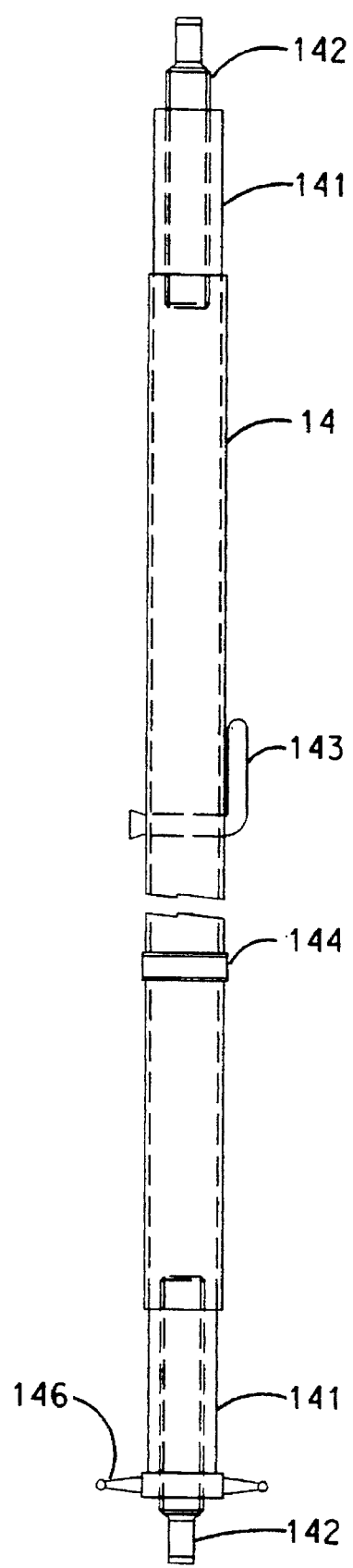

The diagonal brace 14 (FIGS. 13 and 14) is length adjustable, first to enable it to be adjusted to match the height of the upper pallet and second, to enable it to be extended to tighten and impart rigidity to the transporter. It is tubular and has threaded fittings 141 affixed to it at both ends, each of which receives an eye bolt 142. The threads of the fittings and eye bolts at either end are of opposite hand so that when the brace body is rotated about its lengthwise axis in one direction, both eye bolts thread out and when rotated in the other direction, both eye bolts thread in. The brace is, in that respect, like a turnbuckle. A short handle 143 is received by the brace tube to facilitate rotating it relative to the eye bolts. In the assembled transporter, one eye bolt is fastened to the channel-shaped lug 166 on the lower bracket 16 by a bolt passing through the holes 167, and the other eye bolt is received by the pin 186 on the upper bracket 18 (see FIG. 1). To enable more torque to be applied to the brace 14 than can be applied by the handle 143, a bar can be inserted into a tube 144. A handled lock nut 146 locks the brace against loosening.

As discussed above, the transporter is constructed so that it can be disassembled and shipped from a destination to which cars were delivered back to a place of origin in a small volume. The columns and brace fold down against the bottom pallet, and the upper pallet can lie flat on top of a lower pallet. In other words, many pallets and their associated columns and braces can be stacked in a single container, leaving the containers from which some of them came empty for transporting goods on the return trip.

The pallets are loaded by driving the cars onto them. The cars, of course, are supported by the pallets with their wheels nesting in the pans 34. Blocking bars BB (FIG. 2) are fastened to the pallets to block the wheels. Tie downs are fastened between the cars and the tie down bars 36 at the ends of the pallets. The tie downs for the cars on the lower pallets may be highly tightened to lower the cars on their suspensions and thereby reduce the height at which the upper pallet must be located. The opening 32 in the upper pallet allows an uppermost part of the body of a car on the lower pallet to protrude through it to above the plane of the upper pallet, which allows cars with higher profiles to be loaded on the transporter, and accommodated in a standard shipping container.

Before or after the cars are loaded onto the pallets and secured, the columns are erected to stand upright and locked in place. The upper pallet with the car on it is lifted up by a crane or a fork lift and lowered onto the columns to the desired position. Suitable temporary supports or stops can be fitted to the columns to facilitate positioning the upper pallet at the proper height. Coupling pins (not shown) are inserted through the holes 184 in the upper bracket socket pieces 183 and the selected holes 123a, 123b, or 123c in the columns. The coupling pins have arms or rings on their ends that are arranged to engage the keeper plates 185 and are inserted in one rotational orientation and then turned about their axes to engage the keeper plates.

The diagonal brace is raised and manually adjusted to allow its upper eye bolt to be received on the pin 186 of the upper bracket and suitably secured in place on the pin, such as by a lock pin or ring (not shown) received by the pin 186 outboard of the eye bolt. The brace is then tightened to take up the looseness in the couplings between the columns and the socket pieces of the brackets. If desired, diagonal braces can be used on both sides of the transporter.

The transporter includes side bumpers 30, which are fastened by pins or bolts to the side members of the pallets 10 near each corner. The bumpers 30 engage the sides of the container to guide the transporter when it is loaded into the container and hold it in position. The bumpers of the upper pallet are undone at one end and pivoted out to enable the coupling pins to be installed in the upper brackets and columns when the transporter is assembled for shipping and disassembled. End bumpers or spacers (not shown) can be fitted as required to maintain the desired lengthwise spaces between the transporters in a container and between the endmost transporters and the ends of the container.

The invention in its broader aspects is not limited to the specific details shown and described, and departures may be made from such details without departing from the principles of the invention and without sacrificing its chief advantages.

We claim:

1. A vehicle transporter for supporting two cars stacked one above the other for shipment, comprising a lower pallet and an upper pallet, each of which has a substantially rectangular peripheral frame having a pair of side members and a pair of end members joined at corners and a wheel-supporting plate affixed to the frame at each corner that is adapted to support a car by its wheels, four columns joining the lower pallet to the upper pallet, one proximate to each corner of the pallet frames, a lower mounting means for each column, each lower mounting means pivotally attaching a respective column to a respective side member of the frame of the lower pallet so that it can be selectively raised to an upright position to support the upper pallet and folded down for shipping the transporter without cars, an upper support means coacting between each column and the upper pallet for detachably supporting the upper pallet on the respective column at a selected height above the lower pallet, and a length-adjustable brace on at least one side of the transporter connected diagonally between a side member of the frame of the lower pallet between the columns and a side member of the frame of the upper pallet between the columns, the brace including means for imparting stiffness to the transporter by applying forces diagonally between the pallets.

2. A vehicle transporter according to claim 1 wherein each lower mounting means is a lower bracket that is affixed to the side frame member of the lower pallet and has a U-shaped socket member receiving the column within it, the socket having an opening facing away from the end member of the frame nearest to it through which a lower portion of the column passes when the column is folded down.

3. A vehicle transporter according to claim 2 wherein each lower bracket is attached to the lower pallet at a selected adjustable position along the respective side member of the lower pallet.

4. A vehicle transporter according to claim 1 wherein each upper support means includes an upper bracket attached to the upper pallet, each upper bracket having a tubular socket that telescopically receives the corresponding column.

5. A vehicle transporter according to claim 4 wherein each upper bracket is attached to the upper pallet at a selected adjustable position along the respective side member of the frame of the upper pallet.

6. A vehicle transporter according to claim 4 wherein the upper end of each column is tapered such that its uppermost portion is substantially smaller than the sockets of the upper brackets.

7. A vehicle transporter according to claim 1 wherein there are braces on both sides of the transporter.

8. A vehicle transporter according to claim 1 wherein the upper pallet includes an opening between the side frame members and the wheel-supporting plates into which an upper portion of a car supported on the lower pallet can protrude.

9. A vehicle transporter according to claim 1 wherein a pair of side bumpers are attached to each side member of the lower pallet for guiding the transporter into a container.

10. A vehicle transporter according to claim 1 wherein a pair of laterally spaced apart end bumpers are attached on at least one end of the lower pallet to space it a predetermined distance from a longitudinally adjacent transporter in a container.

11. A vehicle transporter according to claim 1 wherein the lower pallet includes tie-down means adjacent to its ends for lowering the height above the lower pallet of a car supported on the lower pallet.

12. A vehicle transporter according to claim 1 wherein the upper and lower pallets are identical and each lower mounting means and each upper support means includes a bracket detachably fastened to a corresponding side member.

13. A vehicle transporter according to claim 12 wherein each bracket includes an upper plate and a lower plate straddling and attached to a respective side member.

14. A vehicle transporter according to claim 1 wherein the means of the brace for imparting stiffness to the transporter by applying forces diagonally between the pallets is a screw jack.

15. A vehicle transporter for supporting two cars stacked one above the other for shipment, comprising a lower pallet and an upper pallet, each of which has a substantially rectangular peripheral frame having a pair of side members and a pair of end members joined at corners and a wheel-supporting plate affixed to the frame at each corner that is adapted to support a car by its wheels, four columns joining the lower pallet to the upper pallet, one proximate to each corner of the pallet frames, a lower mounting bracket for each column, each lower mounting bracket being attached to a corresponding side member of the frame of the lower pallet and having means pivotally supporting the respective column so that it can be selectively raised to an upright position to support the upper pallet and folded down for shipping the transporter without cars, an upper support bracket for supporting the upper pallet on each column, each upper support bracket being attached to a corresponding side member of the frame of the upper pallet, means coacting between each column and the corresponding upper bracket for detachably supporting the upper pallet on the respective column at a selected height above the lower pallet, and a length-adjustable brace connected diagonally between a side of the lower pallet between the columns and a side of the upper pallet between the columns, the brace including means for imparting stiffness to the transporter by applying forces diagonally between the pallets.

16. A vehicle transporter according to claim 15 wherein each lower bracket has a U-shaped socket member receiving a lower part of the column within it, the socket having an opening facing away from the frame end member to which it is closer through which the lower part of the column passes when the column is folded down.

17. A vehicle transporter according to claim 15 wherein each upper bracket has a tubular socket that telescopically receives the corresponding column.

18. A vehicle transporter according to claim 15 wherein the upper end of each column is tapered such that its uppermost portion is substantially smaller than the sockets of the upper brackets.

19. A vehicle transporter according to claim 15 wherein the upper pallet includes an opening between the side frame members and the wheel-supporting plates into which an upper portion of a car supported on the lower pallet can protrude.

20. A vehicle transporter according to claim 15 wherein the upper and lower pallets are identical.

21. A vehicle transporter according to claim 20 wherein the frame each of the upper and lower pallets further includes a pair of cross members spaced apart from each other and extending orthogonally between and joined to the side members, and wherein each wheel-supporting plate is joined to a corresponding cross member.

22. A vehicle transporter according to claim 21 wherein an opening is defined between the side frame members and the cross members of the upper pallet into which an upper portion of a car supported on the lower pallet can protrude.

23. A vehicle transporter according to claim 15 wherein the brace is connected between a lower bracket nearer one end of the lower pallet and an upper bracket nearer the other end of the upper pallet.

* * * * *